US012085439B2

(12) United States Patent
Sakurada et al.

(10) Patent No.: US 12,085,439 B2
(45) Date of Patent: Sep. 10, 2024

(54) INFORMATION PROCESSING APPARATUS, INFORMATION PROCESSING SYSTEM, INFORMATION PROCESSING METHOD, AND MOBILE OBJECT

(71) Applicant: Toyota Jidosha Kabushiki Kaisha, Toyota (JP)

(72) Inventors: Shin Sakurada, Toyota (JP); Hirotada Nakanishi, Toyota (JP); Atsushi Inoue, Nagoya (JP); Hideo Hasegawa, Nagoya (JP); Yurika Tanaka, Yokosuka (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 649 days.

(21) Appl. No.: 17/363,570

(22) Filed: Jun. 30, 2021

(65) Prior Publication Data

US 2022/0011152 A1 Jan. 13, 2022

(30) Foreign Application Priority Data

Jul. 7, 2020 (JP) ................................. 2020-117374

(51) Int. Cl.
*G01G 19/50* (2006.01)
*B64C 39/02* (2023.01)
*B64U 101/60* (2023.01)
*G06V 40/10* (2022.01)

(52) U.S. Cl.
CPC ........... *G01G 19/50* (2013.01); *B64C 39/024* (2013.01); *G06V 40/10* (2022.01); *B64U 2101/60* (2023.01)

(58) Field of Classification Search
CPC ........ G01G 19/50; G01G 19/44; G01G 19/58; G01G 19/62; G01G 19/03; B64C 39/024; G06V 40/10; B64U 2101/64; B64U 2101/60
USPC .............................................................. 177/1
See application file for complete search history.

(56) References Cited

U.S. PATENT DOCUMENTS

| 7,439,456 | B2* | 10/2008 | Ogunnaike | ............ | A45C 13/00 |
| | | | | | 177/148 |
| 8,475,367 | B1* | 7/2013 | Yuen | ....................... | G16H 50/30 |
| | | | | | 177/4 |
| 9,568,353 | B2* | 2/2017 | Sawano | .................. | G01G 23/10 |
| 9,851,211 | B2* | 12/2017 | Hatanaka | ............... | G01C 21/34 |
| 10,039,362 | B2* | 8/2018 | O'Hare | .................. | G01G 19/52 |
| 10,904,807 | B2* | 1/2021 | Kaneda | ................. | B64C 39/024 |
| 11,215,498 | B2* | 1/2022 | Karl | ...................... | G01G 3/1412 |
| 11,287,306 | B2* | 3/2022 | Kellis | .................... | A45C 13/28 |
| 2003/0229474 | A1 | 12/2003 | Suzuki et al. | | |
| 2013/0346016 | A1* | 12/2013 | Suzuki | ................. | A61B 5/1123 |
| | | | | | 702/141 |

(Continued)

FOREIGN PATENT DOCUMENTS

| JP | 2003-296855 A | 10/2003 |
| JP | 2004-157849 A | 6/2004 |

(Continued)

*Primary Examiner* — Jacques M Saint Surin
(74) *Attorney, Agent, or Firm* — Dinsmore & Shohl LLP

(57) ABSTRACT

An information processing apparatus includes an information acquisition interface configured to acquire a measurement result from one or more weight sensors configured to measure a weight of a user, and a controller configured to detect an increase in the weight of the user based on the measurement result.

19 Claims, 3 Drawing Sheets

(56) References Cited

U.S. PATENT DOCUMENTS

2020/0073399 A1\* 3/2020 Tateno ................ G05D 1/0274

FOREIGN PATENT DOCUMENTS

| JP | 2017-090204 A | 5/2017 |
| JP | 2019-109845 A | 7/2019 |
| KR | 2015-0100589 A | 9/2015 |

\* cited by examiner

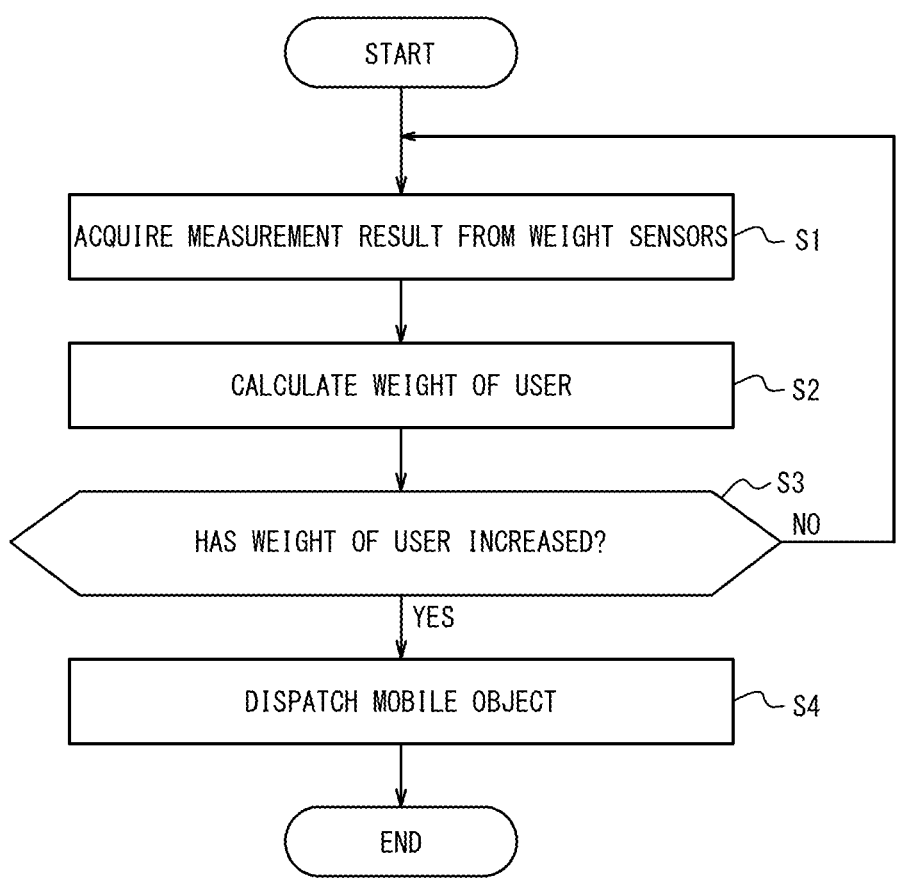

INFORMATION PROCESSING APPARATUS, INFORMATION PROCESSING SYSTEM, INFORMATION PROCESSING METHOD, AND MOBILE OBJECT

CROSS-REFERENCE TO RELATED APPLICATION

This application claims priority to Japanese Patent Application No. 2020-117374 filed on Jul. 7, 2020, the entire contents of which are incorporated herein by reference.

TECHNICAL FIELD

The present disclosure relates to an information processing apparatus, an information processing system, an information processing method, and a mobile object.

BACKGROUND

A luggage weight determination apparatus that determines the weight of luggage with casters carried by a user based on a user's walking speed on an upslope has been disclosed.

CITATION LIST

Patent Literature

PTL 1: JP 2017-090204 A

SUMMARY

Improved convenience for users carrying various types of luggage in various places is desired.

It would be helpful to improve the convenience for users carrying luggage.

An information processing apparatus according to an embodiment of the present disclosure includes:
 an information acquisition interface configured to acquire a measurement result from one or more weight sensors configured to measure a weight of a user; and
 a controller configured to detect an increase in the weight of the user based on the measurement result.

An information processing system according to an embodiment of the present disclosure includes:
 the information processing apparatus; and
 a mobile object.

An information processing method according to an embodiment of the present disclosure includes:
 acquiring a measurement result from one or more weight sensors configured to measure a weight of a user; and
 detecting an increase in the weight of the user based on the measurement result.

A mobile object according to an embodiment of the present disclosure, when an increase in a weight of a user is detected by one or more weight sensors configured to measure the weight of the user, travels to a position at which the increase in the weight of the user has been detected.

According to the information processing apparatus, the information processing system, the information processing method, and the mobile object according to the embodiments of the present disclosure, the convenience for users carrying luggage may be improved.

BRIEF DESCRIPTION OF THE DRAWINGS

In the accompanying drawings:

FIG. 3 is a flowchart illustrating an example of a procedure executed by a server.

DETAILED DESCRIPTION

A user 50 (refer to FIG. 1), when carrying luggage 52 (refer to FIG. 1), may seek assistance in transporting the luggage 52. To provide the user 50 carrying the luggage 52 with assistance in transporting the luggage 52, it is required to determine an increase in the luggage 52 carried by the user 50. It is also required to determine the increase in the luggage 52 carried by the user 50 at various places at which the user 50 walks. It is also required to determine, for various forms of the luggage 52, the increase in the luggage 52 carried by the user 50.

If the weight of the luggage 52 is estimated based on a walking speed of the user 50 on an upslope, then the situations in which the estimation is possible is limited to cases in which the user 50 is moving up the upslope. It is also possible that the luggage 52 of the user 50 does not actually increase. Improvement is desired in terms of accuracy in detecting the increase in the luggage 52 carried by the user 50.

(Outline of Information Processing System 1)

Figure 1:
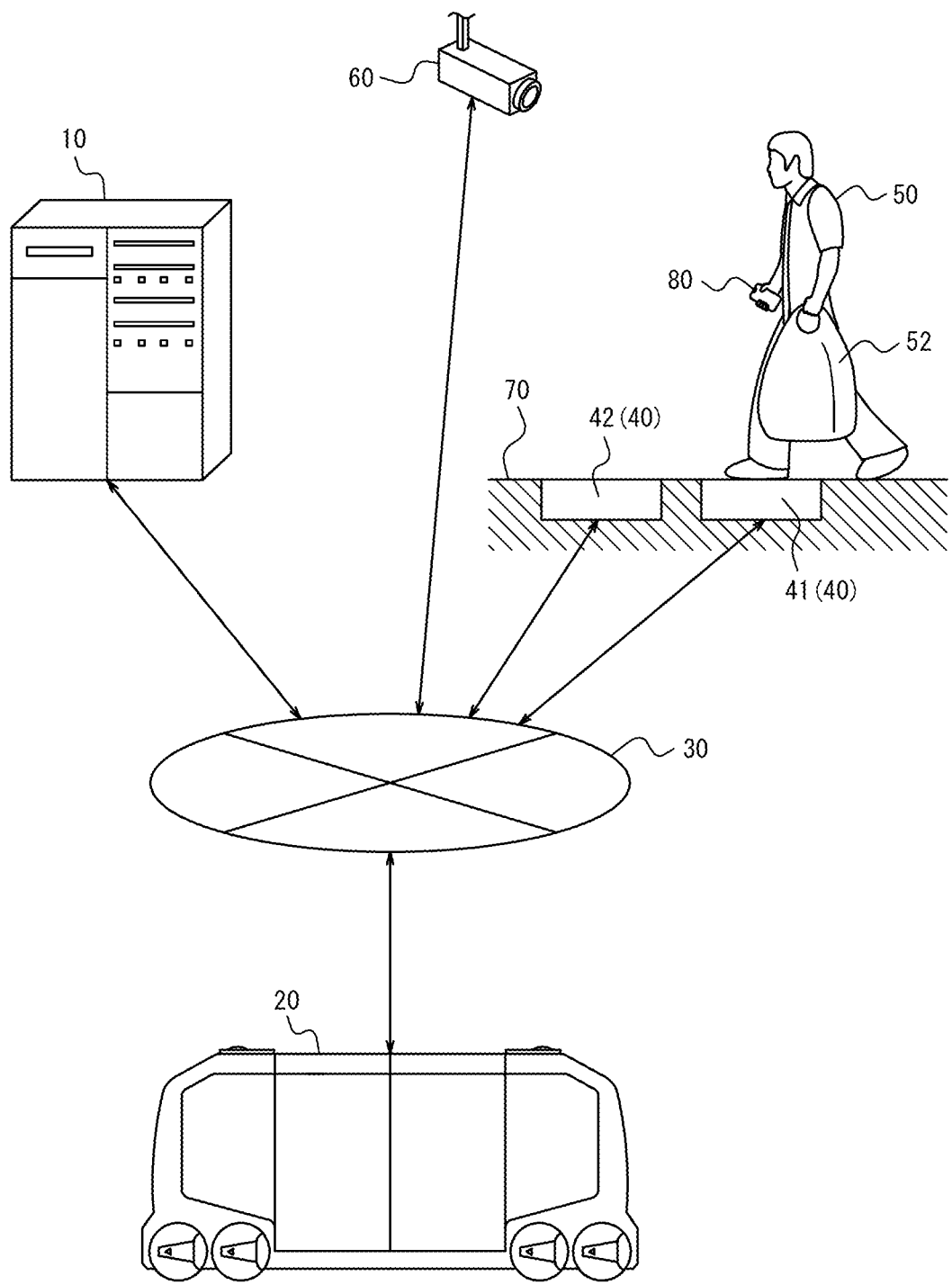
FIG. 1 is a schematic diagram illustrating an example configuration of an information processing system according to an embodiment.
Figure 2:
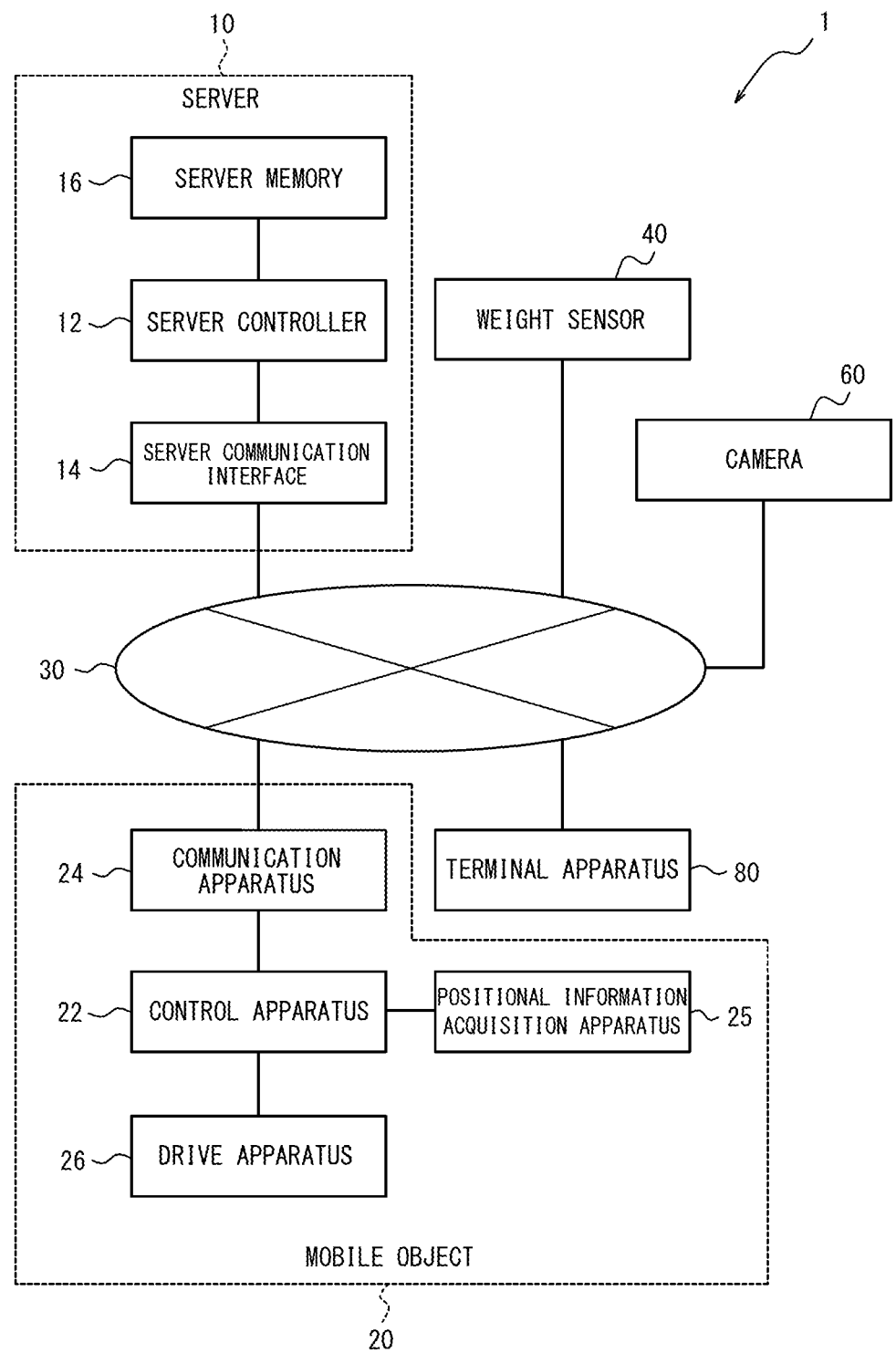
FIG. 2 is a block diagram illustrating an example configuration of the information processing system according to the embodiment.

As illustrated in FIG. 1 and FIG. 2, an information processing system 1 according to an embodiment includes a server 10, a mobile object 20, and weight sensors 40. The information processing system 1 further includes, but is not required to include, a camera 60. The information processing system 1 further includes, but is not required to include, a terminal apparatus 80. The server 10, the mobile object 20, the weight sensors 40, the camera 60, and the terminal apparatus 80 are connected to a network 30 and are communicable with each other. Each of the server 10, the mobile object 20, the weight sensor 40, the camera 60, and the terminal apparatus 80 is not limited to one and may be two or more in number.

The weight sensors 40, in the present embodiment, include a first weight sensor 41 and a second weight sensor 42. The first weight sensor 41 and the second weight sensor 42 are presumed to be installed at different positions on a walking surface 70 in plan view. The weight sensors 40 are installed on or below the walking surface 70, or flush with the walking surface 70 so that the weight of the user 50 located on the walking surface 70 can be measured. The walking surface 70 may include a floor surface of a building or may include an outdoor ground surface or a road surface. The weight sensors 40 may be configured to measure the weight of the user 50 on the ground surface, on a road, or on a floor surface at an entrance/exit, in an interior, at a product delivery point, or at a cash desk of a facility.

The user 50 may carry the luggage 52. The weight of the user 50 refers to the combined weight of the body weight of the user 50 and the weight of the luggage 52. The body weight of the user 50 includes the weight of articles that are worn, such as clothing. The user 50 may carry the luggage 52 in their hand or on their back. The user 50 may drag the luggage 52 with casters.

The terminal apparatus 80 is presumed to be in the possession of the user 50.

(Operation Example of Information Processing System 1)

The information processing system 1 provides a transport service that detects an increase in the luggage 52 carried by the user 50 and dispatches the mobile object 20 for transporting the luggage 52. The information processing system 1 may be operated by an entity that provides the transport service, or may be operated by a different entity.

In the information processing system 1, the server 10 acquires measurement results of the weight sensors 40. The server 10 calculates the weight of the user 50 based on the measurement results of the weight sensors 40. The server 10 monitors the weight of the user 50 and detects whether the weight of the user 50 has increased. When the weight of the user 50 has increased, the server 10 determines that the luggage 52 of the user 50 has increased, and controls the mobile object 20 so that the mobile object 20 can collect the luggage 52 of the user 50 and transport it to a destination for the user 50. That is, the transport service provided by the information processing system 1 is a service in which the mobile object 20 transports the luggage 52 on behalf of the user 50.

Hereinafter, specific configuration and operations for the information processing system 1 that provides the transport service will be described.

<Server 10>

The server 10 includes a server controller 12 and a server communication interface 14. The server 10 detects the increase in the weight of the user 50 using the weight sensors 40. Specifically, the server 10 acquires the measurement results of the weight sensors 40 using the server communication interface 14. The server 10 may include, instead of the server communication interface 14, an interface for acquiring information and acquire the measurement results of the weight sensors 40 through the interface. The server 10 may include both the server communication interface 14 and the interface. The server communication interface 14 and the interface for acquiring information are collectively referred to as an information acquisition interface. That is, the server 10 may include the information acquisition interface. The server controller 12 calculates the weight of the user 50 based on the measurement results of the weight sensors 40. The server controller 12 detects the increase in the weight of the user 50 based on a change in a result of the calculation for the weight of the user 50. When the weight of the user 50 has increased, the server controller 12 determines that the luggage 52 carried by the user 50 has increased and dispatches the mobile object 20 for collecting the luggage 52. The server 10 is also referred to as an information processing apparatus. The server 10 may include a single server apparatus, or a plurality of server apparatuses capable of communicating with each other.

The server 10 monitors the weight of the user 50 based on the measurement results of the weight sensors 40. The server 10 also transmits and receives various types of information related to the provision of the transport service to and from the mobile object 20. The server 10 may be configured to execute, in addition to the above processing, various types of processing related to the provision of the transport service.

The server 10 controls the mobile object 20. The server 10 may communicate with the mobile object 20 to thereby acquire various types of information related to the mobile object 20, such as a position or a speed of the mobile object 20. The server 10 may be configured to execute, in addition to the above processing, various types of processing for controlling the mobile object 20.

The server controller 12 may include at least one processor. The server controller 12 is also referred to simply as a controller. The "processor" in the present embodiment may be, but is not limited to, a general-purpose processor, or a dedicated processor that is dedicated to specific processing. The server controller 12 may include at least one dedicated circuit. The dedicated circuit may include, for example, a Field-Programmable Gate Array (FPGA) and an Application Specific Integrated Circuit (ASIC). The server controller 12 may include the dedicated circuit instead of the processor, or may include the dedicated circuit along with the processor.

The server communication interface 14 includes a communication module and may communicate with the mobile object 20. The server communication interface 14 is also referred to simply as a communication interface.

The server 10 further includes, but is not required to include, a server memory 16. The server memory 16 is also referred to simply as a memory. The memory may be, but is not limited to, a semiconductor memory, a magnetic memory, or an optical memory. The server memory 16 may function as, for example, a main memory, an auxiliary memory, or a cache memory. The server memory 16 may include an electromagnetic storage medium, such as a magnetic disc. The server memory 16 may include a non-transitory computer readable medium. The server memory 16 may store any information used for the operations of the server 10. For example, the memory may store a system program, an application program, or the like.

<Weight Sensor 40>

Each weight sensor 40 has positional information that identifies the position at which the weight sensor 40 is disposed. The positional information is represented, for example, by a latitude and a longitude. The positional information may be represented as a relative position with respect to a predetermined reference point. The server 10 may acquire the positional information for the weight sensors 40 in advance and associate the measurement results of the weight sensors 40 with the positional information. Each weight sensor 40 may output the measurement result in association with its own positional information.

The weight sensors 40 may be seamlessly disposed on the walking surface 70, such as the floor surface or the ground surface, so that weight of the user 50 can be measured wherever the user 50 may be. The weight sensors 40 may be disposed on the walking surface 70 at a predetermined spacing. The weight sensors 40 may be disposed with equal spacing or may be disposed with unequal spacing. The weight sensors 40 may be arranged, for example, in a grid with a repeating pattern.

<<Identification of Weight Using Camera 60>>

The camera 60 captures an image of a person or an object located on the weight sensors 40 and outputs the captured image to the server 10. The server controller 12 of the server 10 may analyze the acquired image and identify whether the person located on the weight sensors 40 is the user 50. The server controller 12 may acquire the measurement result from only the weight sensor 40 on which the user 50 is located. By doing so, load for communications, calculation, or the like can be reduced.

The server controller 12 may identify whether the user 50 located on the weight sensors 40 is carrying the luggage 52. The server controller 12 may identify whether the measurement results of the weight sensors 40 include the weight of the luggage 52. The server controller 12 may identify whether a plurality of persons or a plurality of objects are located on the weight sensors 40. The server controller 12 may identify whether the user 50 is carrying a child. The server controller 12 may identify the manner in which the user 50 is carrying the luggage 52. The server controller 12 may, for example, identify whether the user 50 is dragging the luggage 52 with casters. The server controller 12 may identify whether the user 50 is carrying the luggage 52 in their hand or on their back.

As described above, the server controller 12 can identify various types of information by analyzing the image acquired from the camera 60. The camera 60 may analyze the image in the camera 60 itself to identify the various types of information, and output the identified information to the server 10. In this case, the server controller 12 may acquire a result of the analysis by the camera 60 to thereby acquire the various types of information that can be identified based on the image.

The server controller 12 can calculate the weight of the user 50 based on the information obtained by analyzing the image captured by the camera 60 and the measurement results of the weight sensors 40. For example, the server controller 12 may regard the measurement results of the weight sensors 40 as the weight of the user 50, by identifying that only the user 50 is located on the weight sensors 40. When, for example, the user 50 is located across the two weight sensors 40, the server controller 12 may regard a sum of the respective measurement results of the weight sensors 40 as the weight of the user 50.

In the case in which the weight sensors 40 include the first weight sensor 41 and the second weight sensor 42, the server controller 12 may extract, from the respective measurement results of the first weight sensor 41 and the second weight sensor 42, the measurement result indicating the weight of the user 50 based on the image of the user 50 captured by the camera 60.

The server controller 12 may store, in the server memory 16, the measurement result of each weight sensor 40. That is, the server memory 16 may store the measurement result of each weight sensor 40. In the server memory 16, the server controller 12 may store, for each weight sensor 40, the measurement result in association with the image, captured by the camera 60, of the user 50 located on the weight sensor 40. The server controller 12 may detect the user 50 included in common in each image associated with the measurement result of the corresponding weight sensor 40. The server controller 12 may extract, from the measurement result of each weight sensor 40, the measurement result associated with each image capturing the common user 50, as the measurement result indicating the weight of the user 50.

<<Identification of Weight Using Terminal Apparatus 80>>

The terminal apparatus 80 communicates with the server 10 via the network 30. The terminal apparatus 80 may include a mobile terminal, such as a smart phone.

The terminal apparatus 80 may acquire the positional information for the terminal apparatus 80 itself, for example, by having a configuration that is the same or similar to the configuration of the positional information acquisition apparatus 25 included in the mobile object 20. The terminal apparatus 80 may output the positional information for the terminal apparatus 80 itself to the server 10. Based on the positional information for the terminal apparatus 80 and the positional information for the weight sensors 40, the server controller 12 may identify the person whose weight is measured by the weight sensors 40. For example, when determining that the terminal apparatus 80 is located on the weight sensors 40, the server controller 12 may regard the measurement results of the weight sensors 40 as the weight of the user 50 who is in possession of the terminal apparatus 80.

In the case in which the weight sensors 40 include the first weight sensor 41 and the second weight sensor 42, the server controller 12 may extract, from the respective measurement results of the first weight sensor 41 and the second weight sensor 42, the measurement result indicating the weight of the user 50 based on the positional information for the terminal apparatus 80 that is in the possession of the user 50.

<<Detection of Increase in Luggage 52>>

The server controller 12 determines whether the luggage 52 of the user 50 has increased based on the measurement result for the weight of the user 50. The server controller 12 may determine that the luggage 52 of the user 50 has increased when the weight of the user 50 has increased by a predetermined value or greater. The server controller 12 may detect the increase in the weight of the user 50 by acquiring the weight of the user 50 at a predetermined interval.

<Mobile Object 20>

The mobile object 20 may include a vehicle, such as Micro-Pallete. The mobile object 20 may include, for example, a flying object such as a drone. The mobile object 20 is not limited to one and may be two or more in number.

The mobile object 20 may be configured to operate using automated driving. In a case in which the mobile object 20 is a vehicle, the automated driving may be, for example, performed at any level from Level 1 to Level 5 as defined by the Society of Automotive Engineers (SAE). The automated driving may be performed based on other definitions without being limited to the exemplified definition.

<Specific Configuration of Moving Object 20>

The mobile object 20 includes a control apparatus 22, a communication apparatus 24, and a drive apparatus 26. The control apparatus 22, the communication apparatus 24, and the drive apparatus 26 are communicably connected to each other, for example, via an in-vehicle network, such as a Controller Area Network (CAN), or a dedicated line.

The control apparatus 22 controls individual components included in the mobile object 20. The control apparatus 22 may include at least one processor. The control apparatus 22 may include at least one dedicated circuit instead of the processor, or may include at least one dedicated circuit along with the processor. The control apparatus 22 may further include a memory.

The communication apparatus 24 communicates with the server 10 via the network 30. The communication apparatus 24 may communicate with the terminal apparatus 80 via the network 30, or may communicate with the terminal apparatus 80 without using the network 30. The communication apparatus 24 may be, for example, an in-vehicle communication device. The communication apparatus 24 may include a communication module for connection with the network 30. The communication module may include, but is not limited to, a communication module conforming to a mobile communication standard, such as the $4^{th}$ Generation (4G) standard or the $5^{th}$ Generation (5G) standard.

The drive apparatus 26 functions as motive power for moving the mobile object 20. In a case in which the mobile object 20 is a vehicle, such as Micro-Pallete, the drive apparatus 26 may include wheels driven by an engine, a motor, or the like. In a case in which the mobile object 20 is a drone, the drive apparatus 26 may include a propeller driven by an engine, or a motor, or the like. The mobile object 20 may include a plurality of the drive apparatuses 26 and may change a direction of movement by controlling output power from each drive apparatus 26. The mobile object 20 may further include a steering apparatus for controlling the direction of movement.

The mobile object 20 further includes, but is not required to include, a positional information acquisition apparatus 25. The positional information acquisition apparatus 25 is connected to other components mounted in the mobile object 20 via the in-vehicle network, such as the CAN, or the dedicated line so as to be communicable with each other. The positional information acquisition apparatus 25 acquires the positional information for the mobile object 20. The positional information acquisition apparatus 25 may include a receiver compliant with a satellite positioning system. The receiver compliant with the satellite positioning system may include, for example, a Global Positioning System (GPS) receiver. In the present embodiment, the mobile object 20 can acquire the positional information for the mobile object 20 itself using the positional information acquisition apparatus 25. The mobile object 20 may output the positional information for the mobile object 20 itself to the server 10.

The control apparatus 22 acquires control information for the mobile object 20 from the server 10 via the communication apparatus 24. Based on the control information, the control apparatus 22 controls the drive apparatus 26 and controls the mobile object 20. The control apparatus 22 may cause the mobile object 20 to travel, further based on the positional information for the mobile object 20.

<<Selection of Mobile Object 20>>

When the weight of the user 50 has increased or when it is determined that the luggage 52 of the user 50 has increased, the server controller 12 dispatches the mobile object 20 for receiving and transporting the luggage 52 of the user 50. The server controller 12 causes the dispatched mobile object 20 to travel to the position of the user 50.

In a case in which the information processing system 1 includes a plurality of the mobile objects 20, the server controller 12 may select, for example, one of the mobile objects 20 that can arrive at the position of the user 50 in the shortest time to collect the luggage 52. The server controller 12 may select one of the mobile objects 20 that is located closest to the user 50.

The server controller 12 may acquire, from the mobile objects 20, information indicating whether the mobile objects 20 are capable of transporting the luggage 52. The server controller 12 may select, from the mobile objects 20 that are capable of transporting the luggage 52, any mobile object 20 to travel to the position of the user 50.

The server controller 12 may acquire, from the mobile objects 20, information related to the weights of the luggage 52 that the mobile objects 20 can transport. The server controller 12 may calculate the weight of the luggage 52 carried by the user 50 and select, from the mobile objects 20 that are capable of transporting the calculated weight or greater, any mobile object 20 to travel to the position of the user 50.

The server controller 12 may acquire, from the mobile objects 20, information related to the sizes of the luggage 52 that the mobile objects 20 can transport. The server controller 12 may calculate the size of the luggage 52 carried by the user 50 based on the image captured by the camera 60. The server controller 12 may select, from the mobile objects 20 that are capable of transporting the calculated size or greater, any mobile object 20 to travel to the position of the user 50.

<Control Over Selected Mobile Object 20>

The server controller 12 outputs, to the dispatched mobile object 20, the control information for travelling to the position of the user 50. Specifically, the server controller 12 may output, to the mobile object 20, the control information including the position of the user 50. The mobile object 20 travels based on the control information, thereby travelling to the position of the user 50.

Upon the mobile object 20 arriving at the position of the user 50, the server controller 12 causes the mobile object 20 to collect the luggage 52 of the user 50. After the mobile object 20 has collected the luggage 52 from the user 50, the server controller 12 causes the mobile object 20 to travel to the destination of the luggage 52. The mobile object 20 may acquire the destination of the luggage 52 from the server controller 12 or as an input from the user 50. The mobile object 20 may further include an input device for accepting an input from the user 50. The input device may include a touch panel or the like. The server controller 12 may cause the mobile object 20 to travel in a manner such that the arrival of the mobile object 20 at the destination is timed to match the arrival of the user 50 at the destination of the luggage 52. The server controller 12 may cause the mobile object 20 to travel in a manner such that the mobile object 20 accompanies the user 50.

<Summary>

As described above, the information processing system 1 according to the present embodiment can dispatch the mobile object 20 to transport the luggage 52 on behalf of the user 50 in various situations, such as when the luggage 52 of the user 50 has increased or when the user 50 feels burdened by the luggage 52. In this way, the burden on the user 50 is relieved. Further, since the mobile object 20 is dispatched by detecting the increase in the luggage 52 of the user 50, the convenience for the user 50 is improved.

<Example Flowchart for Information Processing Method>

The server controller 12 of the server 10 included in the information processing system 1 may execute an information processing method including the procedure of the flowchart illustrated in FIG. 3. The information processing method may be implemented as an information processing program to be executed by a processor, such as the server controller 12. The information processing program may be stored on a non-transitory computer readable medium.

The server controller 12 acquires a measurement result from the weight sensors 40 (Step S1).

The server controller 12 calculates the weight of the user 50 (Step S2).

The server controller 12 determines whether the weight of the user 50 has increased (Step S3). When the weight of the user 50 has not increased (Step S3: NO), the server controller 12 returns to the procedure of Step S1.

When the weight of the user 50 has increased (Step S3: YES), the server controller 12 dispatches the mobile object 20 (Step S4). After completion of the procedure in Step S4, the server controller 12 ends the execution of the procedure in the flowchart of FIG. 3.

According to the information processing method of the present embodiment, the mobile object 20 for transporting the luggage 52 on behalf of the user 50 is dispatched in various situations, such as when the luggage 52 of the user 50 has increased or when the user 50 feels burdened by the luggage 52. In this way, the burden on the user 50 is relieved. Further, since the mobile object 20 is dispatched by detecting the increase in the luggage 52 of the user 50, the convenience for the user 50 is improved.

Additional Embodiment

<Dispatch of Mobile Object 20 Based on Utterance of User 50>

The information processing system 1 may further include an audio input device, such as a microphone. The audio input device detects utterances of the user 50 for output to the server 10. The server controller 12 may dispatch the mobile object 20 to collect the luggage 52 of the user 50 based on the utterances of the user 50. The server controller 12 may dispatch the mobile object 20, when an utterance of the user 50 is further detected at the position at which the increase in the weight of the user 50 has been detected. For example, the server controller 12 may dispatch the mobile object 20 to collect the luggage 52 of the user 50, when the increase in the weight of the user 50 is detected and when an utterance indicating that the user 50 feels burdened by the luggage 52 is detected. The server controller 12 may dispatch the mobile object 20 when, regardless of the change in the weight of the user 50, an utterance indicating that the user 50 feels burdened by the luggage 52 is acquired.

<Use of Terminal Apparatus 80>

The terminal apparatus 80 in the possession of the user 50 may function as the camera 60. The user 50 may capture an image of the luggage 52 using the terminal apparatus 80. The server controller 12 may acquire the image of the luggage 52 captured by the user 50 using the terminal apparatus 80 and calculate the size of the luggage 52 of the user 50 based on the acquired image. The server controller 12 may select, from the mobile objects 20 that are capable of transporting the calculated size or greater, any mobile object 20 to travel to the position of the user 50.

The terminal apparatus 80 may serve as the audio input device. The user 50 may utter a sound to the terminal apparatus 80. The terminal apparatus 80 may detect the content of the utterance by the user 50 for output to the server 10. The server controller 12 may dispatch the mobile object 20 based on the content of the utterance by the user 50 inputted to the terminal apparatus 80.

The server controller 12 may notify the user 50 that the mobile object 20 has been dispatched to collect the luggage 52 of the user 50. The server controller 12 may output information related to the mobile object 20 to the terminal apparatus 80. The terminal apparatus 80 may notify the user 50 of the information related to the dispatched mobile object 20. The terminal apparatus 80 may inform the user 50 of the information related to the dispatched mobile object 20, by running an application for notifying the user 50 of the information related to the transport service. When the mobile object 20 arrives at the position of the user 50, the terminal apparatus 80 may transmit and receive information for authenticating the mobile object 20 as the mobile object 20 dispatched by the server 10 to collect the luggage 52.

The embodiments according to the present disclosure have been described based on the drawings and examples. The present disclosure is not limited to the embodiments described above. For example, functions or the like included in each step, or the like can be rearranged without logical inconsistency, and a plurality steps, or the like can be combined together or divided. Other modifications may be made without departing from the gist of the present disclosure.

The invention claimed is:

1. An information processing apparatus comprising:
an information acquisition interface configured to acquire a measurement result from one or more weight sensors configured to measure a weight of a user; and
a controller configured to:
detect an increase in the weight of the user based on the measurement result, and
upon detecting the increase in the weight of the user, cause a mobile object to travel to a position at which the increase in the weight of the user has been detected.

2. The information processing apparatus according to claim 1, wherein
the weight of the user includes a body weight of the user and a weight of luggage of the user.

3. The information processing apparatus according to claim 2, wherein
the controller is configured to detect an increase of a predetermined value or greater in the weight of luggage of the user.

4. The information processing apparatus according to claim 1, wherein
the one or more weight sensors include a first weight sensor and a second weight sensor that are installed at different positions on a road surface, and
the controller is configured to extract the measurement result for the weight of the user from respective measurement results of the first weight sensor and the second weight sensor, to detect the increase in the weight of the user.

5. The information processing apparatus according to claim 1, wherein
the information acquisition interface is configured to acquire an image of the user from a camera configured to capture the user, and
the controller is configured to extract the measurement result for the weight of the user from measurement results of the one or more weight sensors based on the image of the user.

6. The information processing apparatus according to claim 5, further comprising
a memory configured to store the measurement results of the one or more weight sensors, wherein
the controller is configured to store, in the memory, the measurement results of the one or more weight sensors in association with users captured by the camera, and extract measurement results of weight sensors that are associated with a common user as the measurement result for the weight of the user.

7. The information processing apparatus according to claim 5, wherein the controller is further configured to:
analyze the image of the user to identify whether the user is dragging a luggage with casters, whether the user is carrying the luggage by hand and whether the user is carrying the luggage by back.

8. The information processing apparatus according to claim 1, wherein
the one or more weight sensors are configured to measure the weight of the user on a ground surface, on a road, or on a floor surface at an entrance/exit, in an interior, at a product delivery point, or at a cash desk of a facility.

9. The information processing apparatus according to claim 1, wherein
the information acquisition interface is configured to acquire utterances of the user from an audio input device configured to detect the utterances of the user, and
the controller causes the mobile object to travel to the position at which the increase in the weight of the user has been detected, when an utterance of the user is detected at the position at which the increase in the weight of the user has been detected.

10. An information processing method comprising:
acquiring a measurement result from one or more weight sensors configured to measure a weight of a user;
detecting an increase in the weight of the user based on the measurement result; and upon detecting the increase in the weight of the user, causing a mobile object to travel to a position at which the increase in the weight of the user has been detected.

11. The information processing method according to claim 10, further comprising
detecting an increase of a predetermined value or greater in a weight of luggage of the user.

12. The information processing method according to claim 10, further comprising:
acquiring respective measurement results of a first weight sensor and a second weight sensor that are included in the one or more weight sensors; and
extracting the measurement result for the weight of the user from the respective measurement results of the first weight sensor and the second weight sensor, to detect the increase in the weight of the user.

13. The information processing method according to claim 10, further comprising:
acquiring an image of the user from a camera configured to capture the user; and
extracting the measurement result for the weight of the user from measurement results of the one or more weight sensors based on the image of the user.

14. The information processing method according to claim 13, further comprising:
storing, in a memory configured to store the measurement results of the one or more weight sensors, the measurement results of the one or more weight sensors in association with users captured by the camera; and
extracting measurement results of weight sensors that are associated with a common user as the measurement result for the weight of the user.

15. The information processing method according to claim 13, further comprising:
analyzing the image of the user to identify whether the user is dragging a luggage with casters, whether the user is carrying the luggage by hand and whether the user is carrying the luggage by back.

16. The information processing method according to claim 10, further comprising:
acquiring utterances of the user from an audio input device configured to detect the utterances of the user; and
causing the mobile object to travel to the position at which the increase in the weight of the user has been detected, when an utterance of the user is detected at the position at which the increase in the weight of the user has been detected.

17. A mobile object that, when an increase in a weight of a user is detected by one or more weight sensors configured to measure the weight of the user, causes the mobile object to travel to a position at which the increase in the weight of the user has been detected.

18. The mobile object according to claim 17, wherein the mobile object is Micro-Pallete or a drone.

19. The mobile object according to claim 18, wherein the mobile object travels to the position at which the increase in the weight of the user has been detected, when an utterance of the user is further detected at the position at which the increase in the weight of the user has been detected.

* * * * *